United States Patent [19]

Davies et al.

[11] Patent Number: 4,949,278

[45] Date of Patent: Aug. 14, 1990

[54] EXPERT SYSTEM ARCHITECTURE

[75] Inventors: Kenneth E. Davies, Hants, United Kingdom; Walter C. Geddes, Rockville, Md.; Mark J. Kline, Arlington, Va.; Alexander T. Maluta, Redondo Beach, Calif.; Bruce E. Naylor, San Jose, both of Calif.; Harrison Scofield, Morgan Hill, Calif.; Jeffrey N. Stevens, Gaithersburg, Md.

[73] Assignee: International Business Machines Corporation, Armonk, N.Y.

[21] Appl. No.: 291,796

[22] Filed: Dec. 29, 1988

[51] Int. Cl.⁵ .............................................. G06F 15/18
[52] U.S. Cl. .................................................... 364/513
[58] Field of Search ....................... 364/513, 300, 200

[56] References Cited

U.S. PATENT DOCUMENTS

| | | | |
|---|---|---|---|
| 4,805,679 | 2/1989 | Czinner | 364/513 |
| 4,825,353 | 4/1989 | Jenkins | 364/513 |
| 4,839,822 | 6/1989 | Dormond et al. | 364/513 |

OTHER PUBLICATIONS

Artificial Intelligence in Computer Aided Design; Computers in Industry 8 (1987); pp. 277–282; Jiaoying et al.

*Primary Examiner*—Allen MacDonald
*Attorney, Agent, or Firm*—Jesse L. Abzug

[57] ABSTRACT

An expert system is provided which can be accessed by other application programs operating within any of the available operating environments in a general purpose computer system. In this architecture, an expert system consultation subsystem provides the means for performing expert consultations. Included within the expert system subsystem is a task manager which initiates and manages a plurality of concurrent consultations. Interface programming provides the capability for the expert system consultation subsystem to communicate and pass data and commands between it and other application programs operating within the computer system. Further, means are provided to allow the expert system subsystem to access data stored on database management systems.

6 Claims, 7 Drawing Sheets

EXPERT SYSTEM ARCHITECTURE

BACKGROUND OF THE INVENTION

1. Field of the Invention

This invention relates generally to the field of artificial intelligence, and more particularly to expert systems. In particular, an architecture for providing embedded expert systems is described.

2. Background Information

The use of expert systems in various industries, such as banking, insurance, manufacturing, aerospace, etc., has increased dramatically since tools for creating and consulting expert systems became commercially available in recent years. These prior art tools, of which Expert Systems Environment, available commercially from IBM Corporation, is an example, share the property of being standalone programs operating in an environment in which only one consultation at a time could be performed.

In order to realize the full benefits of expert systems technology, however, it is desirable to have an expert system which can be accessed in a variety of different manners. For instance, one may desire to exploit expert systems technology in a previously existing computer application, such as insurance underwriting. In the insurance underwriting example, a knowledge engineer would interview an expert underwriter, gleaning the knowledge which he uses when determining whether to accept or reject policies. Instead of spending the time to write procedural programs to do all that, the knowledge engineer can put that expert knowledge into a knowledge base as rules and facts and achieve significant increases in productivity and maintainability of the system. Since the processing of insurance applications requires complex application programs, as well as expert systems, system performance requires the expert system to be embedded in, or callable from, the application programs.

Many large users of expert systems have very integrated programming systems that have been developed at great expense to satisfy their own business requirements. Now, these customers desire to utilize expert systems processing behind the scenes. While it may be possible to use standalone expert systems, having to log off and log on again from the application that is running is inconvenient, at best.

Additionally, it is preferable to deliver expert systems capability through the same end-user application system, often without the user even knowing that an expert system is being consulted. Also, some customers have significant investment in the systems they have built and in the data that is stored in their systems. They want to start taking advantage of expert systems as an integrated tool to make use of the wealth of data already obtained. An expert system consultation is like any other application; you don't want to have a user enter data that is already in the system. By integrating expert systems into the users preexisting computer system, the preexisting data can be made accessible, and the end-user can access it through the normal network facilities as defined for the rest of their applications.

There are several problems that must be solved in order to integrate an expert system capability into existing application programs. First, you must get access to data that is already in the user's computer system. Data in many database management systems is not readily available, since different systems have unique rules for access, maintenance, integrity and backout, etc.

Second, it is necessary to develop an expert system that can function in different environments, without writing it many times, or writing many different interfaces. Each of these different software environments has its own set of constraints, rules, etc. In order to truly implement an embedded expert system, it is required that the expert systems be architected to be compatible with all existing environments that will be utilized.

OBJECTS OF THE INVENTION

It is the object of this invention to provide an embedded expert systems capability, which can be accessed by application programs running on a computer system.

It is a further object of this invention to allow existing customer applications to make expert systems consultations.

It is another object of this invention to provide an expert systems capability which is transparent to the end-user.

It is still another object of this invention to provide an expert system capability that is reliable, easily maintained, and operates independently of other programs operating in a computer system.

It is another object of this invention to provide an expert systems capability that can be used simultaneously by a number of users.

SUMMARY OF THE INVENTION

An expert system is provided which can be freely accessed by other application programs operating within any of the available operating environments in a general purpose computer system. In this novel architecture, an expert system consultation subsystem provides the means for performing expert consultations. Included within the expert system subsystem is a task manager which initiates and manages a plurality of concurrent consultations. Interface programming provides the capability for the expert system consultation subsystem to communicate and pass data and commands between it and other application programs operating within the computer system. Further, means are provided to allow the expert system subsystem to access data stored on database management systems.

DESCRIPTION OF THE PREFERRED EMBODIMENT

While the invention will be described with reference to a specific commercially available general purpose computer system, it should be understood that the architecture claimed herein can function in most generally available commercial computer systems manufactured by many different companies. Therefore, in no way shall the operating environment in which the invention will be described be considered to limit the scope of the claims hereafter provided.

For background purposes, the preferred embodiment of the invention will be described in relation to a general purpose computer system called the IBM System/370 (IBM is a registered trademark of the International Business Machines Corp.) available commercially from the IBM Corporation. A detailed discussion of the System/370 operation can be found in IBM publication number GA22-7000, entitled "System/370 Principles of Operation" available from IBM. Additionally, the invention to be described below operates as a subsystem within the Multiple Virtual Storage (MVS) operating system running on the System/370. For a detailed description of the MVS operating system, reference is made to IBM publication number GC28-0984-1, entitled "OS/VS2 MVS Overview", the contents of which are hereby incorporated by reference.

Figure 1:
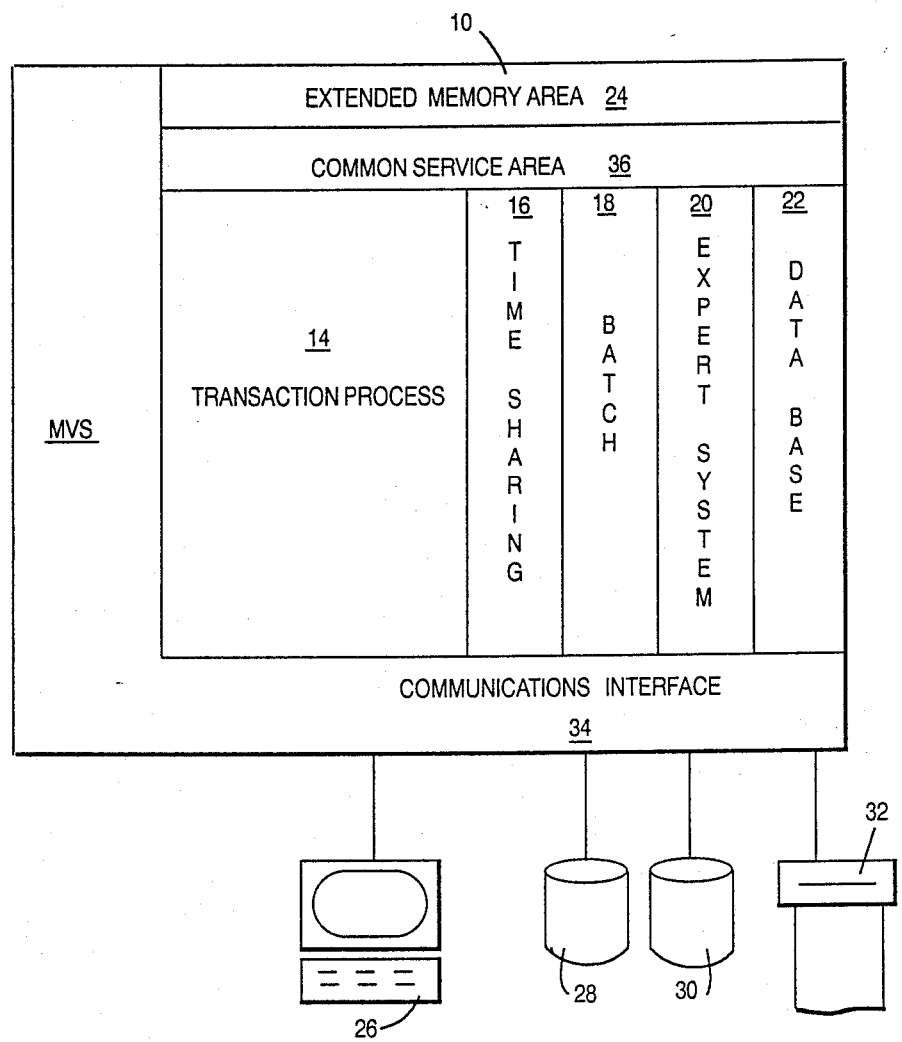
FIG. 1 is a block diagram showing the computer system environment of the expert system architecture.

The computer system in which the invention operates is shown in the block diagram in FIG. 1. Typical of general purpose computer systems, there is shown a central processing unit (CPU) 10 which includes circuits for processing data, as well as circuits for storing data or memory. Control of the CPU is provided by the MVS operating system. The MVS operating system controls the flow and processing of data among all the various components within the computer system.

Also shown in FIG. 1, are input/output (I/0) devices such as terminal 26, direct access storage devices 28, 30 and printer 32. It is readily apparent to one skilled in the art that any number of I/0 devices can be included in a general purpose computer system including, terminals, personal computers, disk drives, tape drives, optical disk storage, printers, etc., and the I/0 devices shown are merely illustrative. Communication among the I/0 devices 26, 28, 30, 32 and with the CPU 10 is under the control of a specialized type of software, referred to as the communications interface 34. The specifics of the communication interface 34 are beyond the scope of the present invention and will not be discussed in detail.

Within the architecture of the MVS operating system, separate tasks, or subsystems, can operate independently and simultaneously, allowing a multi-tasking or multiprocessing environment. Allowing multiple MVS tasks increases the capacity/throughput of the computer, since many functions can be processed concurrently. MVS provides this multiprocessing capability by setting up several discrete address spaces in its memory in which different subsystems can operate. Shown in FIG. 1 are a transaction processing subsystem 14, a timesharing subsystem 16, a batch subsystem 18, an expert system consultation subsystem 20 and a database management subsystem 22. Each of these subsystems operates independently of the others and has the capability to address all regions of the extended memory area 24.

As stated in the Background section, the subsystems 14, 16, 18, 20 and 22, are architected differently, have different rules for data storage, access, communication, etc. This makes it difficult for them to communicate with each other. To overcome this problem, a common service area (CSA) 36 is provided. All communication between MVS subsystems takes place through the CSA 36, which serves as a common ground and allows subsystems to communicate with and pass data between other subsystems.

To achieve the desired objective of allowing multiple, concurrent consultations in an embedded mode, the expert system of the present invention has been implemented as MVS subsystem 20. As an MVS subsystem, expert system consultation subsystem 20 can run in an embedded mode with any of the other application-oriented subsystems, such as transaction processing 14, timesharing 16 and batch 18. Further, it can have access to data controlled by the database management subsystem 22. It can also run in a standalone mode, or "interactive" mode.

Figure 2:
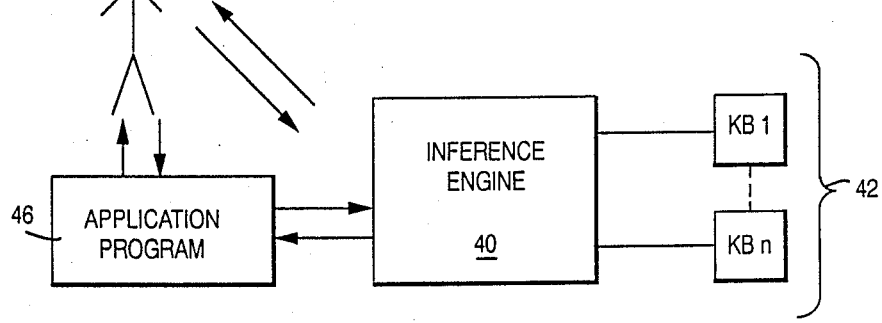
FIG. 2 is a diagram showing the flow of information in an expert system.

As shown in FIG. 2, a typical expert system consultation system includes an inference engine 40 and knowledge bases 1-n 42, which contain knowledge about different problem domains. Inference engine 40 contains the programming code which performs the inferencing procedures to conclude values based upon data provided by an individual consultor 44 or application program 46 and knowledge data stored in the knowledge bases 42. A consultation can be performed in an interactive mode, in which data passes directly between consultor 44 and inference engine 40, or in an embedded mode, in which an application program 46 communicates directly with inference engine 40. For a more thorough discussion of expert systems inference engines in general, reference is made to U.S. Pat. 4,763,277 and U.S. Pat. 4,648,044, which are hereby incorporated by reference.

Figure 3:
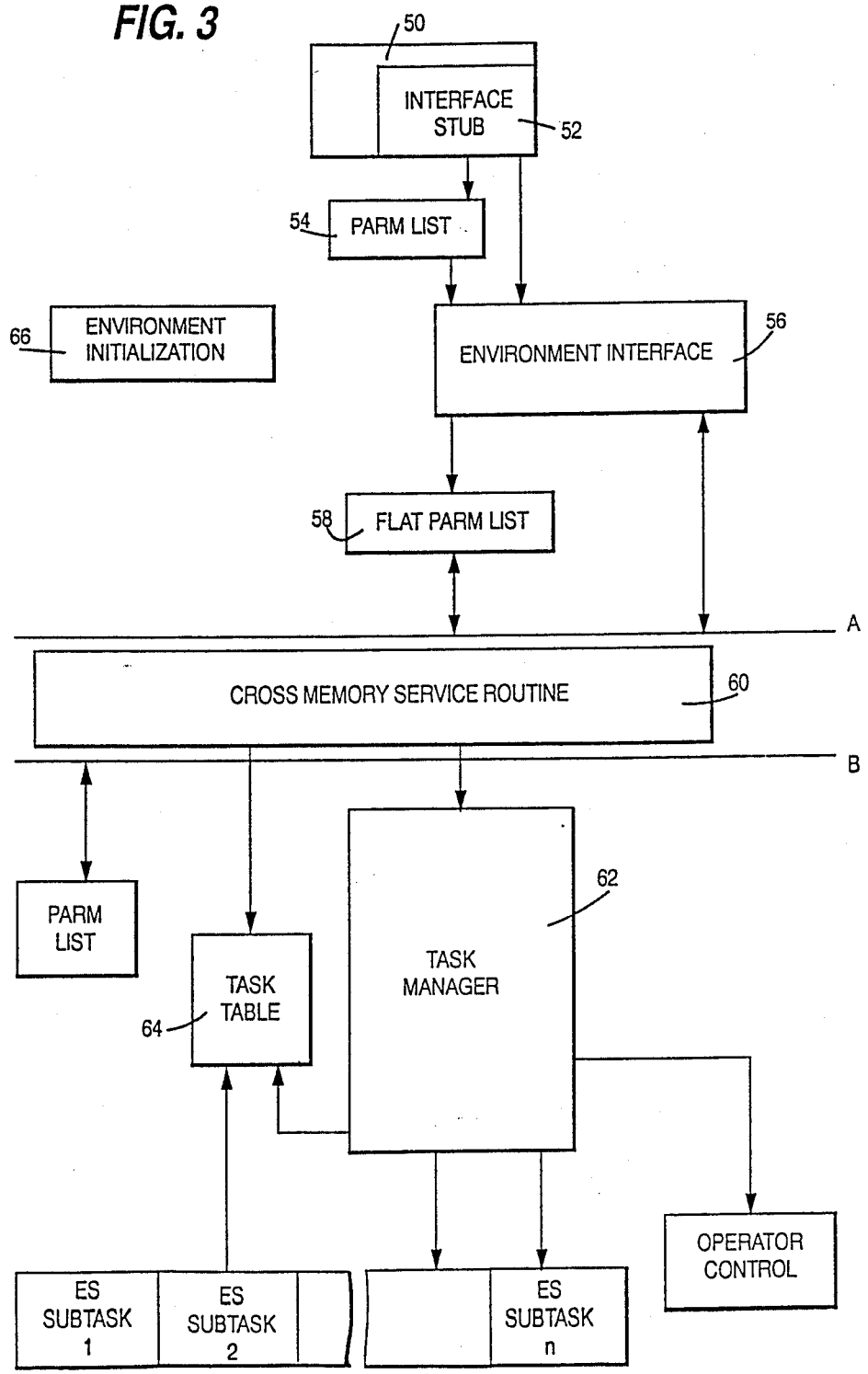
FIG. 3 is a block diagram showing the components of the expert system architecture.

The architecture of the embedded expert systems is shown in FIG. 3. The blocks shown above line A represent elements contained within one or more of the applications-oriented MVS subsystems, i.e., transaction processing 14, timesharing 16 or batch 18 (FIG. 1), referred to as the application region. Block 50 represents an application program, such as insurance underwriting or loan processing which may require expert systems consultation. When application program 50 invokes the expert system subsystem to perform a consultation it will have to issue commands to request or set data values and pass information to control the flow of the consultation.

Within each application 50, a small inter-language interface stub of programming code 52 is included. Interface stub 52 is link-edited with the application program 50 and provides the direct interface between the application program 50 and the expert systems consultation components. The major function of the interface stub 52 is to call the expert systems function and generate and pass along parameters upon which the consultation is to be based.

A parameter list 54 is generated by the interface stub 52 and is then passed along to the environment interface 56 which essentially makes the connection to the expert systems subsystem, tells it that a consultation is desired, and sends along an invocation request. Environment interface 56 also translates the parameter list 54 into a flat PARM LIST 58 and sends it to the common service area, which is designated as the area between lines A and B.

Common Service Area and Cross Memory Service Routine

The CSA 36 (FIG. 1) is an area of memory that holds programs and data needed by a variety of computer software applications. As mentioned above, programs that communicate within MVS need to speak a common language. This is accomplished by using a set of instructions and macros, known as cross memory services.

Cross memory services is a way of allowing different address spaces to share either programs or data. Somebody processing in the transaction processing subregion's designated address space cannot directly reference anything in the expert system address space. In order to make the connection, there must a communication protocol which allows information to pass between the two regions Block 60 represents the cross memory service routine that provides the gateway between the application region and expert system region.

Figure 4:
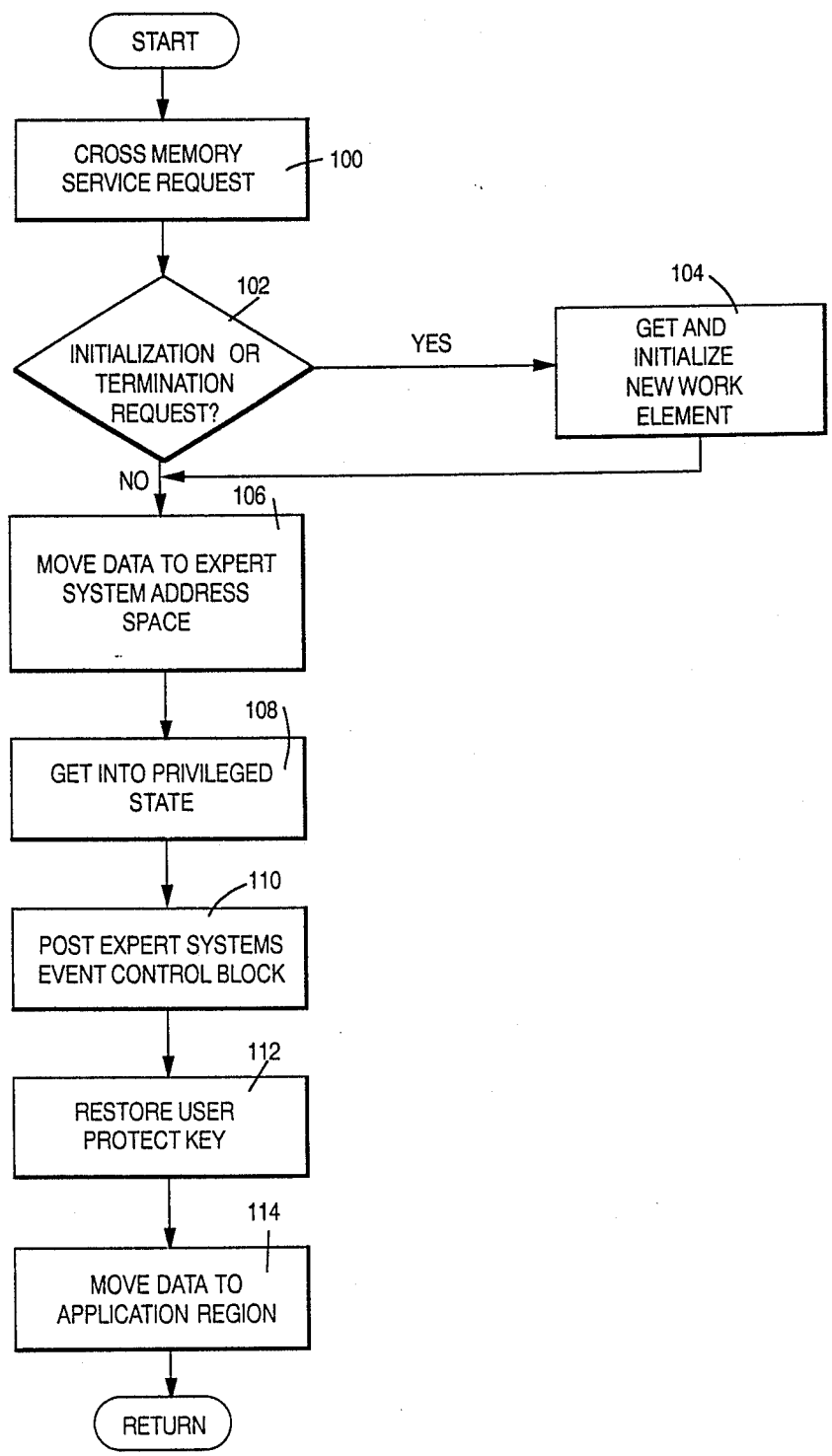
FIG. 4 is a flow diagram for the cross memory service routine.

A flow chart for the cross memory source routine is shown in FIG. 4. A service or invocation request from the environment interface is received in block 100. Block 102 tests to determine whether the service request is an initialization or termination request. If it is an initialization or termination request, block 104 gets and initializes an expert system work element and saves the application region address space identifier for future use.

If the service request is not an initialization or termination request, block 106 checks the expert system task table 64 (FIG. 3) for the task table entry for the specific caller's consultation. The address of that particular task's work element is also obtained from the task table. A storage area in the expert systems address space is obtained and its address is saved in the work element. A cross memory move of the data from the application region to the expert systems region, or address space, is performed.

Blocks 108, 110 and 112 are commands for allowing MVS to post the expert systems event control block, and then to restore the user's storage protection key. In block 114, data from the expert systems region is moved via a cross memory move to the application region, thus completing the data interchange.

Expert System Region

The expert system region, or subsystem, is represented by that portion of FIG. 3 below line B. Task manager 62, receives the consultation request from cross memory service routine 60. If the request states that a consultation is desired, the task manager looks at all the subtasks that are active to see if a particular knowledge base is loaded and ready to go. If it is, then the consultation is invoked. Each particular consultation is an independent task, and hundreds of consultations can be invoked concurrently. While only one copy of the expert system consultation code is contained in the ESE region, each consultation requires its own knowledge base. Therefore, if, when a consultation is invoked, a free knowledge base does not exist, then the task manager requests a copy to be written in to the extended memory area 24 from DASD device 28, 30 (FIG. 1). When a consultation is completed, the knowledge base goes dormant rather than being erased from storage, since it is more efficient to keep it there for future use than to have to delete it and rewrite it into memory the next time it is needed. The knowledge base stays in extended memory until a system operator erases it.

Task Manager

Requests to initialize expert system consultations are called Expert Systems Work Elements (EWE). These are MVS control blocks that are queued to the task manager 62 by the cross memory service routine 60.

After a consultation, or session, is established, cross memory service routine 60 will post the expert system subtasks 1—n directly for all subsequent communications.

Figure 5:
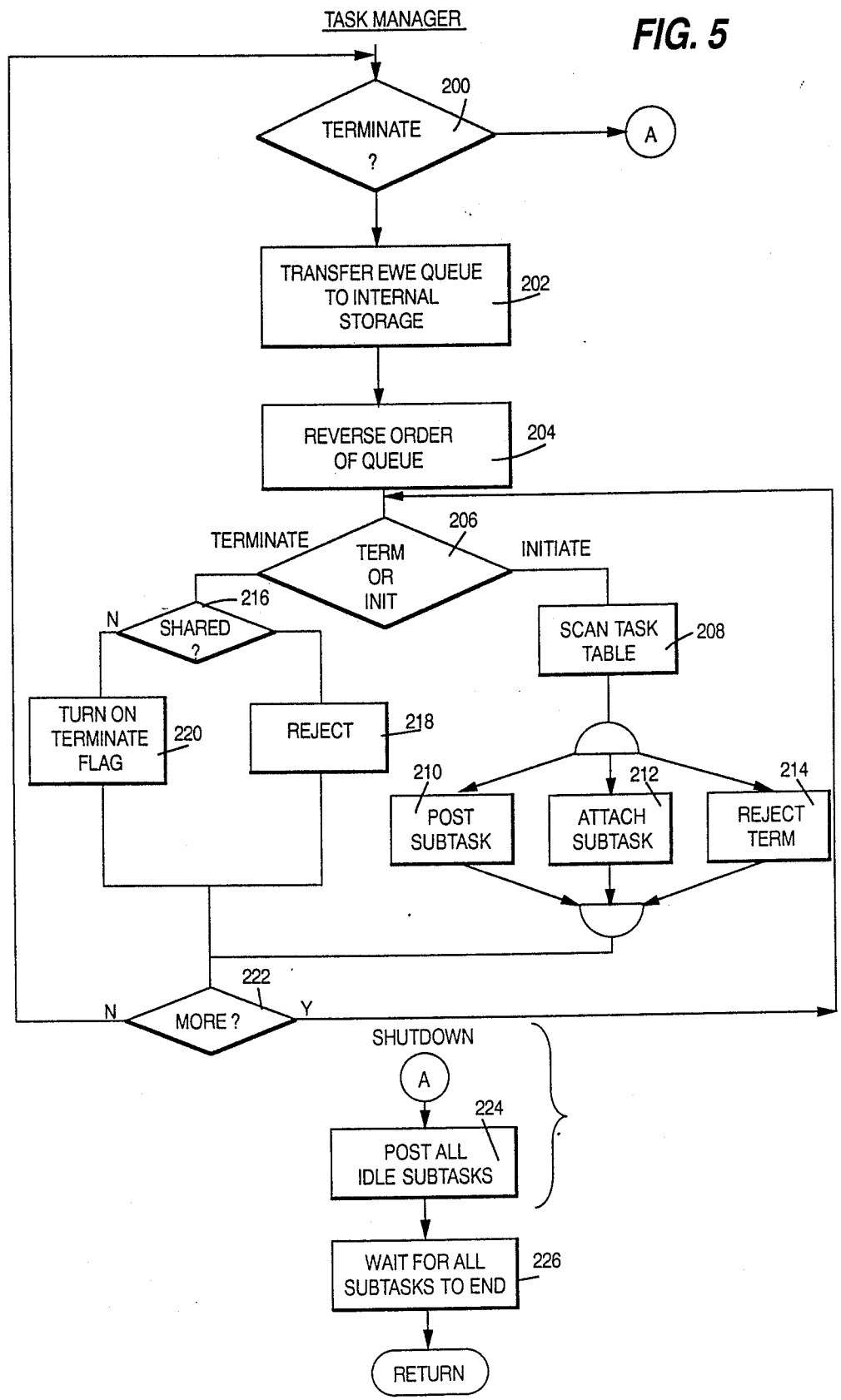
FIG. 5 is a flow diagram for the Task Manager.

With reference to FIG. 5, the operation of the task manager will be more fully described. A session request is tested in block 200 to see if the request is an initialization request or a subsystem termination request. If it is a subsystem termination request, the task manager will implement the termination, or shutdown, procedure described below. Otherwise, the cross memory service routine will "wake up" the task manager and the EWE will be queued to internal storage in block 202. While processing the queue, the cross memory service routine will continue to queue up new EWE's.

In block 204, the sequence of EWE's in the queue is reversed so that the oldest one is the first to be processed. Block 206 determines whether the request is an "initiate" request or a termination request. If an initiation request, processing continues with block 208, otherwise block 216 is called.

The task table (described below) is scanned in block 208 to find an idle subtask which has the required knowledge base loaded. If an idle subtask with the correct knowledge base is found, or an idle subtask is found which can load the proper knowledge base, block 210 posts the subtask to complete the consultation. If no idle subtask is found, block 212 attaches a new subtask. If all subtasks are busy, and the subtask limit has been reached, the initiate request is rejected by block 214.

If block 206 determines that the request is a termination request, then block 216 first checks to see if the subsystem was brought up in a shared mode. If so, block 218 rejects the request. If not, the termination indicator is set "on" and the external queue is flagged as "closed" in block 220.

Block 222 checks to see if there are more EWE's on the internal queue. If there are, processing returns to block 206 for processing. If not, processing returns to block 200.

If a termination request is received in block 200, the shutdown procedure is initiated. Block 224 turns on the termination flag in the task table for all subtasks. Any inactive subtasks are posted so that they will run and detect the termination flags, thereby ending themselves. When all subtasks have ended (Block 226), control returns to the INITIALIZATION routine.

Initialization

The overall operation of the expert system subsystem is under control of a system operator. Through the ENVIRONMENT INITIALIZATION routine, identified as block 66 in FIG. 3, the operator can control configuration options such as:

1. Default high level qualifier for work datasets.
2. Maximum number of expert system subtasks.
3. Subsystem is shared or not.
4. Preference for maximum or minimum number of subtasks.
5. Subsystem identifier.
6. Time out monitor interval.

Figure 6:
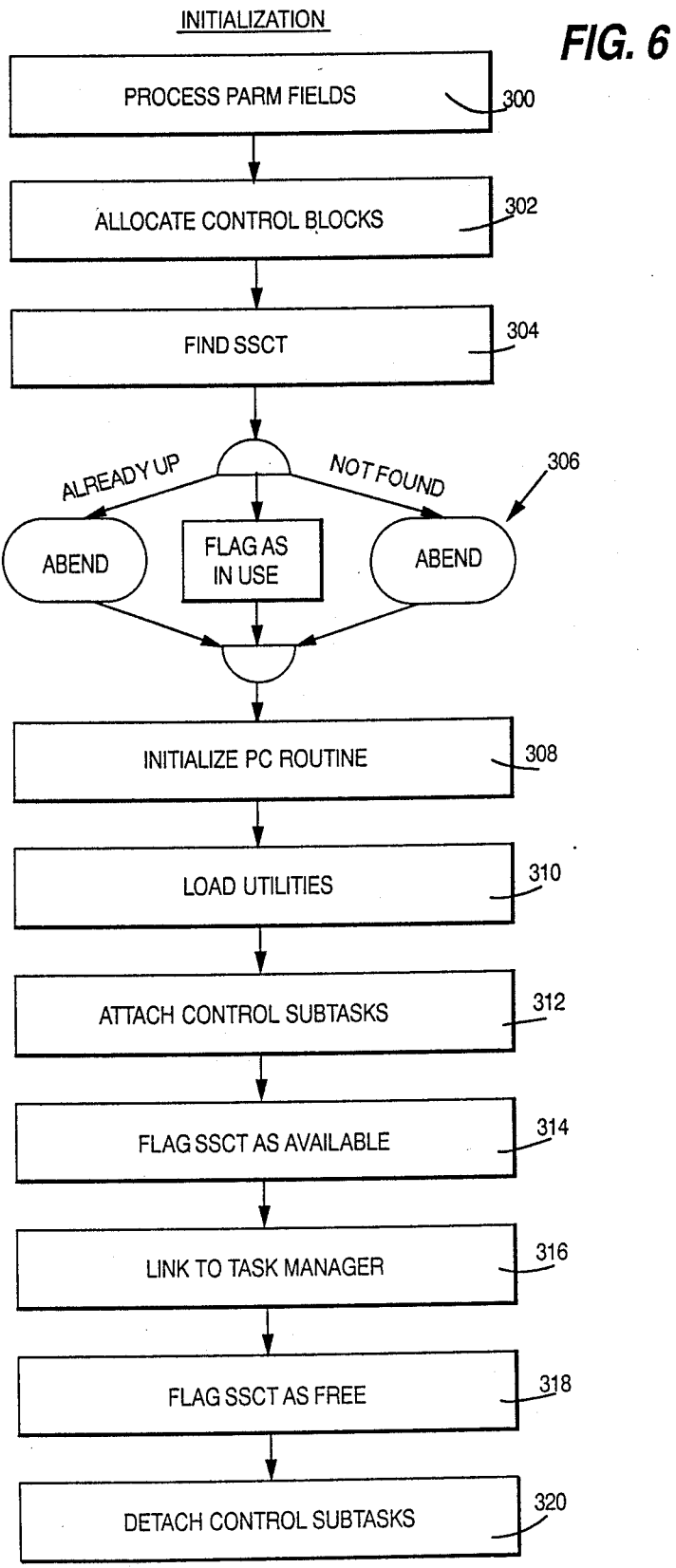
FIG. 6 is a flow diagram for the Environment Initialization routine.

Other control parameters are described with reference to the INITIALIZATION flow chart in FIG. 6.

In step 300, the "PARM=" fields of the MVS job control language are customized by the system operator to select any or all of the configuration options identified above. Step 302 allocates storage for the global control block and for the task table. In step 304, the MVS subsystem control table (SSCT) chain is searched for the proper identifier.

If the SSCT identifier is not found, or is flagged as already "in use", an ABEND command is issued by block 306. The INITIALIZATION routine will notify MVS if the expert system subsystem is already "in use" to prevent it from being brought up a second time. If the identifier is found, and the expert system subsystem is not "in use", the SSCT is then flagged "in use".

Block 308 loads the cross memory services routine into the CSA. Additional utility subroutines are loaded into memory in Block 310. Block 312 attaches the operator control subtask (used by system operators to query and control the subsystem) and the timeout monitor subtask (prevents runaway consultations). Finally, the SSCT entry is flagged as "Available" in block 314, and the Task Manager is linked in block 316.

After all expert systems consultations are completed, control returns from the Task Manager in Block 318, and the operator control and timeout monitor subtasks are detached in block 320.

Task Table

Figure 7:
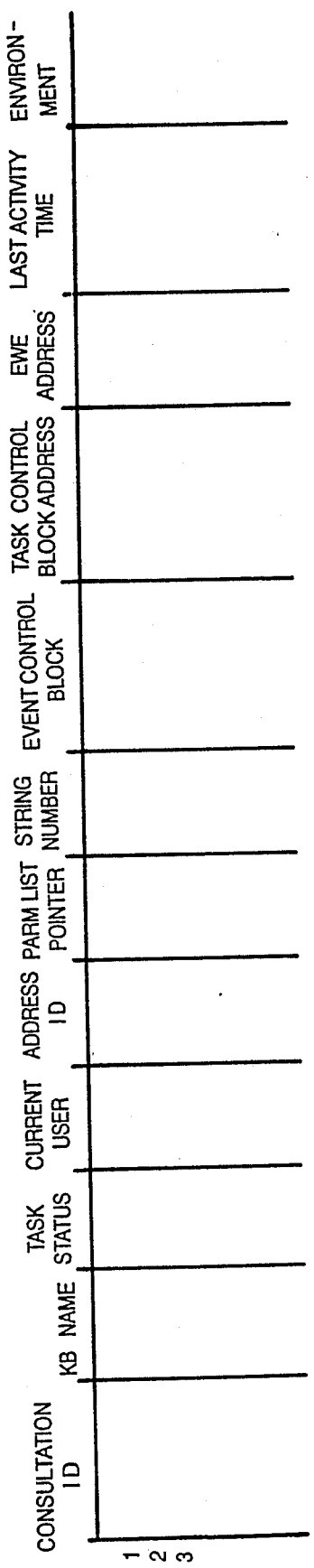
FIG. 7 is a diagram showing the elements in the Task Table.

The Task Table 64 in FIG. 3 keeps track of all the expert systems consultations occurring within the expert systems region. FIG. 7 illustrates the types of information that the Task Table records for each consultation. The Task Table items and a brief description of these items are as follows:

| | |
|---|---|
| CONSULTATION ID | A unique identifier for each consultation. |
| KB NAME | Name of knowledge base consulted. |
| TASK STATUS | Current status of consultation. |
| CURRENT USER | Identification of user. |
| ADDRESS ID | MVS address space identifier. |
| PARM LIST POINTER | Pointer to parameter list. |
| STRING NUMBER | A relative number assigned to each subtask. |
| EVENT CONTROL BLOCK | Used to synchronize 2 tasks using MVS Wait/Post macros. |
| TASK CONTROL BLOCK ADDRESS | Address of the subtask's Task Control Block. |
| EWE ADDRESS | Address of ES Work Element. |
| LAST ACTIVITY TIME | Elapsed time since last activity. |
| ENVIRONMENT | Batch, transaction, time sharing, etc. |

Function Calls

The function calls which control the communication between the application program and the expert systems region are divided into three categories.

| | 1. Control Functions |
|---|---|
| INIT | Establish communication with the expert system. |
| SETADDR | Setup communication area addresses. |
| CONSULT | Begin consultation. |
| WAIT | Wait for return from expert system. |
| RETURN | Return to expert system to continue processing. |
| END | End the consultation. |
| TERM | Terminate expert system. |
| | 2. Data Access Functions |
| GETPARAM | Get expert system parameter name. |
| GETSDATA | Get system data. |
| GETARG | Get expert system arguments. |
| SET | Set expert system parameter values. |
| | 3. Tracing Functions |
| PUTERROR | Put error message to trace file and reset values. |
| PUTTRACE | Put a message into the trace file. |

Example Consultation Flow

Figure 8:
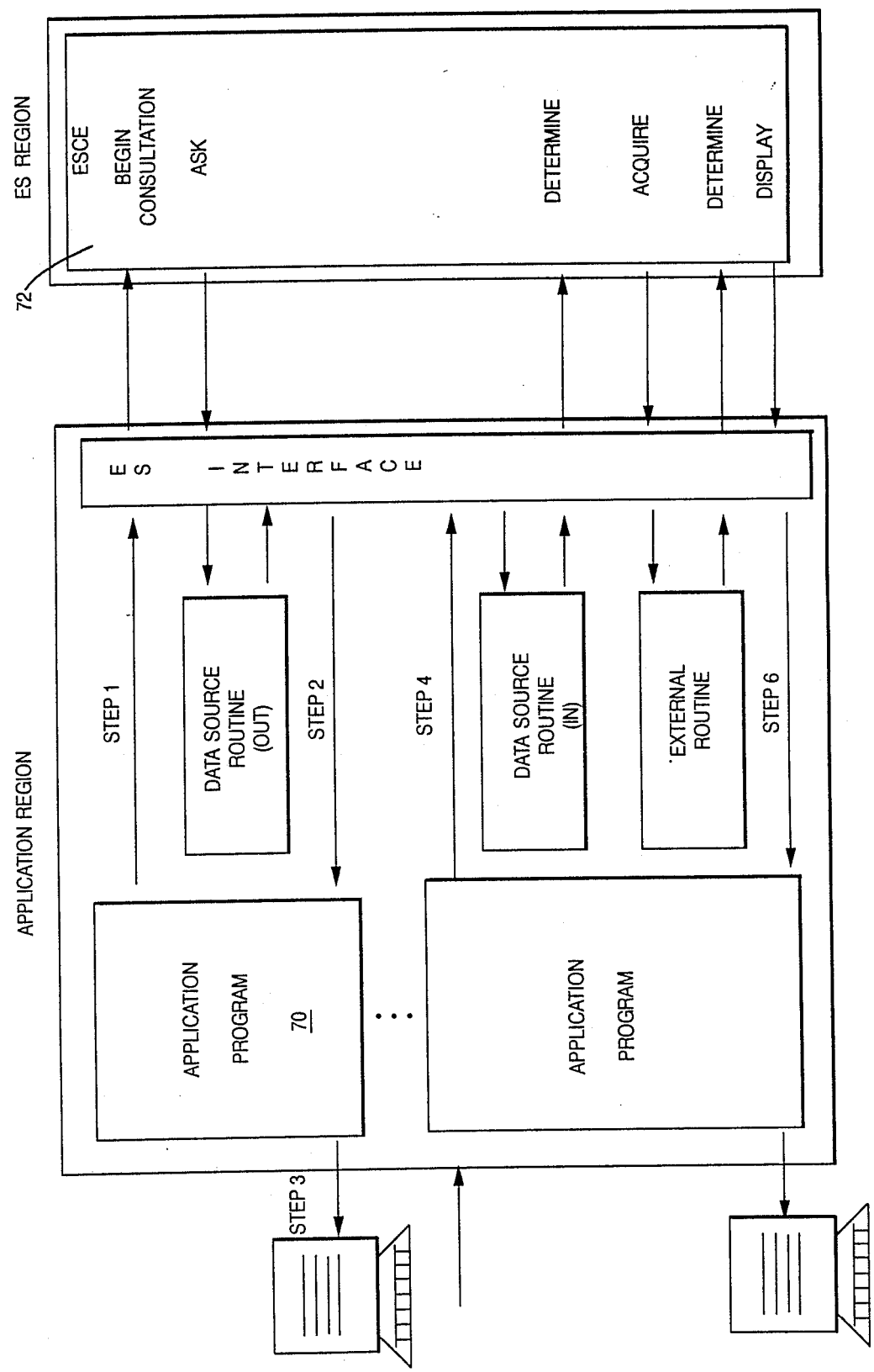
FIG. 8 is a diagram showing the flow of information in a typical expert system consultation.

Referring to FIG. 8, a sample expert systems consultation flow will be described.

Step 1—Application program 70 running in an MVS subsystem initiates a consultation by executing a function call named INIT to establish communication with the expert system 72. Within the expert system region 72, required data areas are set up and the inference engine is invoked to perform a consultation. Meanwhile, application program 70 is waiting for a response from the expert system.

Step 2—The expert system gains control and begins the consultation. As the inferencing progresses, the knowledge base initiates a request for end user data via an ASK control text statement. This is performed when the expert system does not have enough information in order to complete its inferencing procedure.

Step 3—The application program then displays a screen to the end user requesting additional data.

Step 4—The application program then receives control, and passes the data required back to the expert system region.

Step 5—The expert system then performs its inferencing procedure until it either completes the consultation or desires further information. If further information is desired Steps 2–4 will then be repeated.

Step 6—When the expert system consultation is completed, control is passed back to the application program which continues processing.

While the invention has been described with reference to a preferred embodiment, it is easily recognized by those skilled in the art that various changes in detail may be made therein without departing from the spirit, scope and teaching of the invention. Accordingly, the invention herein disclosed is to be considered merely as illustrative, and the invention is to be limited only as specified in the claims.

We claim:

1. A computer system for performing expert consultations comprising:
   means for storing data, said data including application programs and knowledge information;
   means for processing said application programs;
   means for performing expert consultations based upon said knowledge information in response to requests from said means for processing said application programs;
   means, associated with said exert consultation means, for managing a plurality of concurrent expert consultations; and
   means for controlling the flow of data between said expert consultation means and said means for processing said application programs,
   whereby an exert system can be accessed by an application program running in said computer system.

2. The computer system as claimed in claim 1, wherein said means for controlling the flow of data includes a cross memory device routine.

3. The computer system as claimed in claim 1, wherein said means for managing a plurality of concurrent expert consultations includes a task manager.

4. The computer system as claimed in claim 1, wherein said expert system consultation means includes means for performing interactive consultations.

5. The computer system as claimed in claim 1, wherein said means for storing data includes database information and said expert system consultation means includes means for accessing said database information.

6. The computer system as claimed in claim 1, wherein said expert system consultation means includes an inference engine.

\* \* \* \* \*

UNITED STATES PATENT AND TRADEMARK OFFICE
CERTIFICATE OF CORRECTION

PATENT NO. : 4,949,278

DATED : 08/14/90

INVENTOR(S) : K.E. Davies, W.C. Geddes, M.J. Kline, A.T. Maluta, B. E. Naylor, H. Scofield and J. N. Stevens It is certified that error appears in the above-identified patent and that said Letters Patent is hereby corrected as shown below:

Column 8, line 45 & 51
Claim 1, change "exert" to --expert--.
Claim 1, change "exert" to --expert--.

Signed and Sealed this

Twenty-eighth Day of April, 1992

Attest:

HARRY F. MANBECK, JR.

*Attesting Officer*   *Commissioner of Patents and Trademarks*